Oct. 10, 1961  H. N. NIEBUHR  3,003,531
SPACING MEANS FOR CUTTER GUIDES IN BREAD SLICING MACHINES
Filed Aug. 17, 1959  2 Sheets-Sheet 2
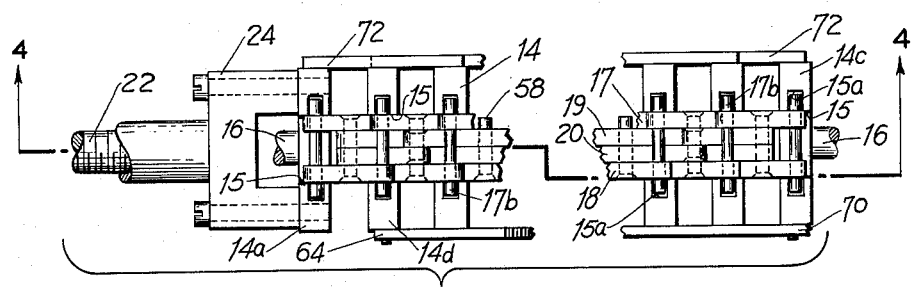
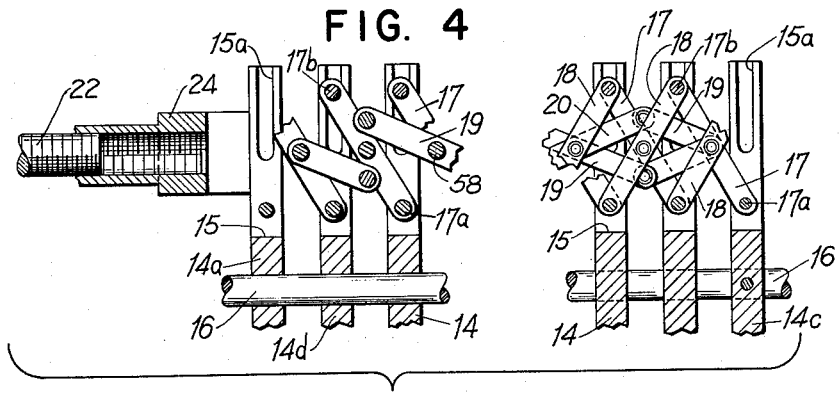
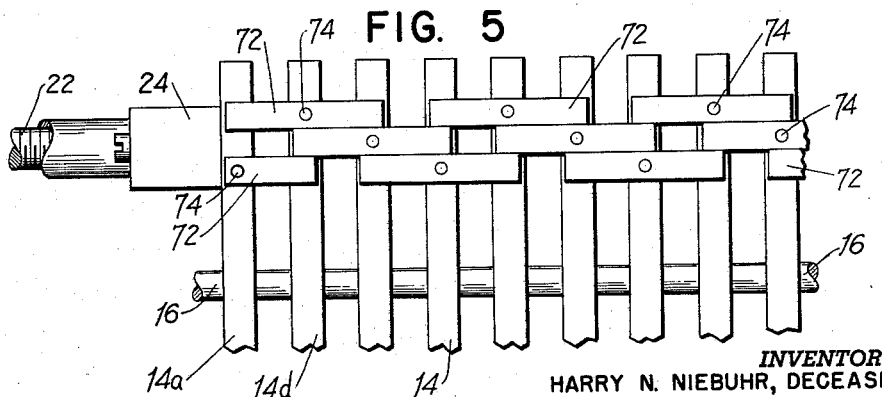
INVENTOR.
HARRY N. NIEBUHR, DECEASED
by FLORENCE L. NIEBUHR, EXECUTRIX
BY
ATTORNEY

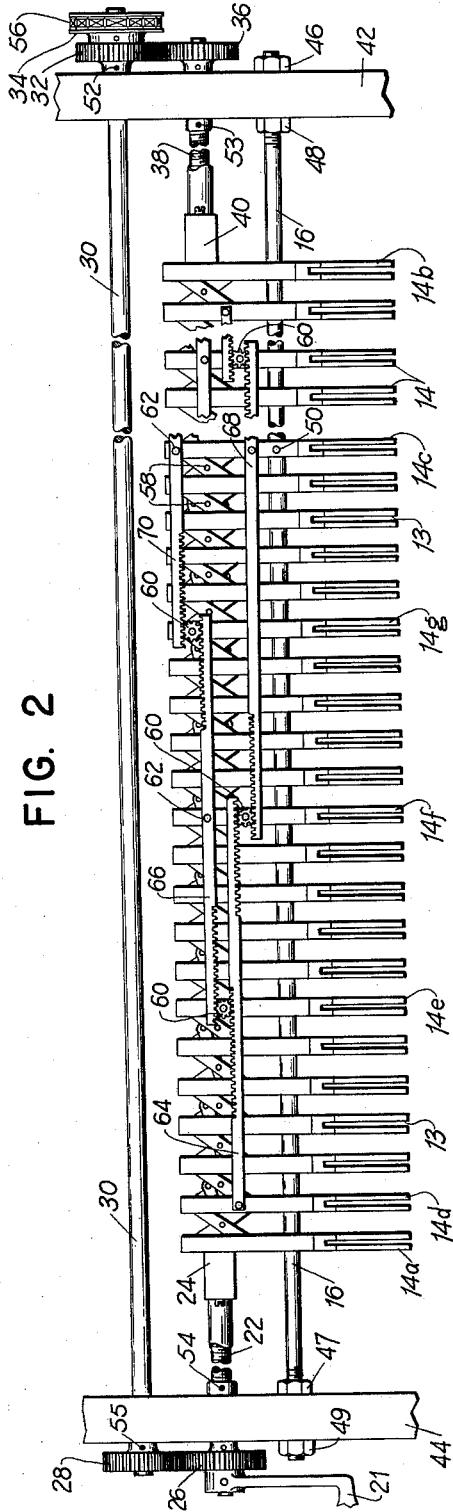

United States Patent Office

3,003,531
Patented Oct. 10, 1961

3,003,531
SPACING MEANS FOR CUTTER GUIDES IN BREAD SLICING MACHINES
Harry N. Niebuhr, deceased, late of Davenport, Iowa, by Florence L. Niebuhr, administratrix, Davenport, Iowa, assignor to American Machine & Foundry Company, New York, N.Y., a corporation of New Jersey
Filed Aug. 17, 1959, Ser. No. 834,102
7 Claims. (Cl. 146—88)

This invention relates to a lazy tong construction particularly of the type used in bread slicing machines.

It is an object of the invention to provide an improved spacing mechanism for the cutting blades of the slicing machine.

More particularly, it is an object of the machine to provide a construction which will have increased stability and accuracy and which will maintain its stability and accuracy after considerable wear at articulations and bearing points of the device.

The usual range of spacing in a bread slicing machine is from about $5/16''$ to $5/8''$. The intermediate positions between these extremes are infinite in number and require considerable accuracy in a production operation. When a conventional lazy tong structure is employed it is apparent that slackness due to wear at the pivot pins of the lazy tongs will adversely affect the accuracy and produce backlash.

The inaccuracy and backlash so produced are cumulative. It is therefore an object of this invention to prevent inaccuracy due to wear on the pins by preventing its effect from being cumulative.

Still another object of the invention is to provide a simplified stabilizing means so that the planar stability of the lazy tongs may be maintained without the need of housings or plural guide bars.

These and other objects become apparent from a consideration of the following detailed description and explanation of an embodiment of the invention which is made in connection with the accompanying drawings wherein:

FIG. 1 is a sectional end elevation, with parts removed and parts broken away, taken through the slicing area of a bread slicing machine of the endless band type incorporating the adjustable blade guiding means constructed in accordance with the principles of the invention;

FIG. 2 is a plan view of the lazy tong structure of the adjustable saw blade guiding device illustrating the rack and pinion takeup for slack elimination;

FIG. 3 is a partial side elevation of the lazy tong structure of the adjustable blade guiding device;

FIG. 4 is a sectional plan view taken on lines 4—4 of FIG. 3; and

FIG. 5 is a partial bottom view of the adjustable blade guiding device illustrating the stabilizing structure of the same.

Referring to FIG. 1, there is illustrated a fragmentary portion of a slicing machine of the type shown, for example, in the patent to Kottman 2,375,231 dated May 8, 1945. There is shown in FIG. 1 a loaf of bread 10 which is passed downwardly from the left, as shown by the arrow, to the slicing blades 12 which are guided by the upper and lower guide fingers or guides 14. Guide fingers 14 have a blade guiding slot 13.

Referring to FIGS. 1, 2, 3 and 4, it may be seen that the guide fingers 14 are slidably mounted on a single shaft or guide bar 16 and are operated by the lazy tong structure 17, 18, 19 and 20 located in the U-shaped slot 15 formed at the end of the guide 14 distant from the slot 13. As may be more clearly seen in FIGS. 3 and 4, the lazy tong structure comprises primary lazy tongs formed of a series of links 17 and 18. Each of the links 17 and 18 are pivoted on a stationary pivot 17a on the guides 14. The other ends of the links 17 and 18 are pivotally connected to each other by means of a pin 17b engaging with the groove 15a of the slot 15 of the guide 14. The links 17 and 18 are further pivotally attached to each other where they cross at their midpoints forming a primary scissor-type lazy tong. The links 17 and 18 are spaced from each other and the space occupied by a secondary tong system comprising a series of links 19 and 20. The links 19 and 20 are pivotally joined to each other at their ends to form a series of X's while their crossover point is pivoted on the same pivot as every other crossover point of the links 17 and 18 of the primary tong structure. It is evident from a consideration of FIGS. 3 and 4 that this form of lazy tongs provides increased stability particularly in a plane parallel to the plane of the links.

A hand crank 21 is mounted on and rotates threaded shaft 22 which, as more clearly illustrated in FIG. 4, is threaded into a coupling 24 mounted on the first guide finger 14a to the left in FIG. 2. A gear 26 secured to the threaded shaft 22 engages and rotates a gear 28 secured to the shaft 30. The shaft 30 carries at its other end a gear 32 and a sprocket 34. The gear 32 meshes with a gear 36 secured to a second threaded shaft which threadedly engages a coupling 40, similar to the coupling 24, but mounted on the guide finger 14b at the right hand end in FIG. 2. The threads on shaft 38 and coupling 40 are of the opposite hand to the threads on shaft 22 and coupling 24.

Shaft 30 and threaded shafts 22 and 38 are mounted in bearings in the main frame members 42 and 44. The single shaft 16 is adjustably mounted in the same main frames 42 and 44 and may be adjusted to the left or right as shown in FIG. 2 by means of the nuts 46, 48 and 47, 49. The central guide finger 14c is pinned by the pin 50 to the shaft 16. The set screws 52, 53, 54 and 55 permit a selective sliding motion for adjustment between the gears 32 and 36, 26 and 28 and their respective shafts 20, 22 or 38. In this way it is possible to laterally adjust in assembling so that the finger 14c of the upper set of guides can be properly aligned with the corresponding finger 14c of the lower set of guides. The sprocket 34 carries a chain 56 which provides co-ordinated rotary adjustment motion between the upper and lower set of guides.

It will be seen that rotation of the crank 21, through the above described gears and shafts, will move the oppositely threaded couplings 40 and 24 toward or away from each other depending upon the direction of rotation of the crank 21. Because center guide 14c is pinned to the shaft 16, the lazy tongs 17, 18, 19 and 20 will cause a change of spacing between all of the guides 14.

The lazy tong structure will normally provide equidistant spacing between the guides 14. However, wear on the lazy tong pins 58 can result in slackness or backlash which, being cumulative in nature, will give substantial variation in the spacing. For example, in a slicing machine having forty-three parallel bars, wear on the pivot pins of .005 inch would yield a cumulative wear of a little over a fifth of an inch. This difficulty is overcome by the novel rack and pin mounted on the guide bars.

Referring more particularly to FIG. 2, every fifth guide bar 14 has mounted thereon a pinion 60 while every tenth bar additionally has pivoted thereto by pin 62 racks 64, 66, 68 and 70. These racks are arranged in the manner illustrated in FIG. 2 so that they engage the pinion 60 five or ten guide bars away from the respective pin 62.

Still referring to FIG. 2, it will be seen that if the guide bar 14d is moved twenty units of linear measurement to the left then by action of the racks and pinions, per se, the guide bar 14e will be moved fifteen units to the left while the guard bar 14f will be moved ten units to the left and the guide bar 14g five units to the left. Each guide bar's center to center distance will be increased by, of course, one unit.

Considering for the purpose of the illustration the ten unit movement to the left of guide bar 14f, the guide bar 14c is, of course, held stationary by the pin 50. Consequently, as the rack 66 is moved to the left ten units with the guide bar 14f the pinion 60 between rack 66 and 70 will reduce by one-half the motion to the left of the guide bar 14g. Hence 14g will move the desired number of linear units, namely five. By like reasoning, it becomes evident that by like operation of the racks 66, 64 and 68 and their engaged pinions 60, the guide bars 14d and 14e will move fifteen and twenty linear units, respectively.

Since the engagement of the rack and pinions is substantially without backlash, it becomes evident that with the arrangement illustrated in FIG. 2, every fifth guide bar will move its proper distance independently of the lazy tongs. The lazy tongs, however, will operate the four intermediate guide bars. Error due to wear on the pins 58 of the lazy tongs is thus not cumulative across the entire mechanism but is accurately corrected at each point of attachment of the racks. The structure therefore permits longer life to the lazy tongs by permitting greater wear on these pins or, conversely, the initial manufacturing tolerances may be increased.

Referring to FIGS. 2 and 5, it will be further observed that the unitary shaft 16 supporting the guides 14 will not prevent rotative movement of the guides about the axis of the shaft 16. Guides 14a and 14b are, of course, supported from rotation by the couplings 24 and 40, respectively. Heretofore, in structures of this type it has been necessary to either provide a second shaft 16 or other structure as a guideway or an enclosed housing.

With reference to FIG. 5, it will be seen that the bars or plates 72, which may be cut from flat stock bars, in lengths to engage three guides 14 in their widest position may be secured as by the rivet pin 74 in staggered groups of three on each succeeding guide. Thus each guide engages both adjacent guides and as may be seen from FIG. 5 the guides are stably maintained in the same plane as the guide 14a held by the coupling 24. Additional strength is derived by positioning the bars 72 in slidable edgewise contact with each other.

What is claimed is:

1. In a band slicing machine having a plurality of spaced blade guides, means for slidably mounting said guides for adjustment toward and away from each other, at least one of said guides having rotatably mounted thereon a pinion, a pair of gear racks engaging said pinion, one of said pair of racks being secured to a guide which is positioned to one side of said pinion mounting guide and the other of said pair of racks being secured to another guide on the opposite side of said pinion mounting guide, whereby equal spacing between said guides is maintained when one of said guides is moved relatively toward or away from another of said guides.

2. In a band blade slicing machine having a plurality of blade guides, said blade guides being arranged in a single plane transverse to the transit of said blades and adjustable in said plane toward and away from each other to vary the spacing therebetween, a lazy tong structure mounted along said blade guides and engaging said blade guides to maintain equal spacing between each of said blade guides in any adjusted position thereof, a secondary guide spacing mechanism connected to a group of said blade guides comprising guides occurring every certain number, said mechanism comprising a system of racks and rotatable pinions wherein a rotatable pinion secured to one of said group of blade guides is engaged by a pair of racks, one of which pair is anchored to a guide in said certain number to one side of said pinion and the other of said pair is anchored to a guide in said certain number on the opposite side of said pinion, whereby backlash in said lazy tongs is overcome in the guides of said group.

3. A blade guide assembly for use in a band slicing machine, said assembly comprising a transverse support, blade guides slidably mounted on said transverse support, means to move at least one of said blade guides along said transverse support, a lazy tong structure mounted along said guides and in engagement with said guides to provide primary uniform spacing means between said guides, a secondary spacing device to correct for backlash in said lazy tongs, said secondary spacing device comprising a pinion rotatably mounted on each guide in a certain recurring number, and a pair of racks engaging each said pinion, one of said pair of racks being anchored to a guide spaced said certain number to one side of said pinion, and the other of said pair being anchored to a guide spaced said certain number to the other side of said pinion.

4. A blade guide assembly for use in a band slicing machine, said assembly comprising a transverse support, blade guides slidably mounted on said transverse support, means to move at least one of said blade guides along said transverse support, a lazy tong structure mounted along said guides and in engagement with said guides to provide primary uniform spacing means between said guides, a secondary spacing device to correct for backlash in said lazy tongs, said secondary spacing device comprising a pinion rotatably mounted on each guide in a certain recurring number, a pair of racks engaging said pinion, one of said pair of racks being anchored to a guide spaced said certain number to one side of said pinion, and the other of said pair being anchored to a guide spaced said certain number to the other side of said pinion, and a plurality of stabilizing members mounted on said guides to maintain said planar stability of said guides, each of said stabilizing members comprising a member secured to each said guide in a plane parallel to the plane of said guides and slidably engaging at least one of the guides adjacent thereto.

5. A device substantially as set forth in claim 4 further characterized in that at least one of said guides is secured against said sliding movement, and a mechanism to move at least one other of said guides in said sliding movement.

6. A device substantially as set forth in claim 4 further characterized in that one centrally located guide is secured against said slidable movement on said transverse support, and a mechanism to move the lateral or terminal guides simultaneously toward and away from each other on said transverse support.

7. A blade guide assembly for use in a band slicing machine, said assembly comprising a transverse support, blade guides slidably mounted on said transverse support, primary means constructed and arranged to proportionally space said guides, and a secondary spacing device to move certain of said guides a distance sufficient to maintain equal spacing between said certain guides, said device comprising a system of racks and pinions wherein the rotatable pinions are mounted on the intermediate guides of said certain guides and the racks are secured on the lateral guides of said certain guides and to some of the intermediate guides so that each pinion is engaged by a pair of racks to provide a variable ratio between the movement of said certain guides to correct at said certain guides for errors in said primary means.

References Cited in the file of this patent

UNITED STATES PATENTS

| | | |
|---|---|---|
| 1,062,700 | Firsching | May 27, 1913 |
| 2,375,231 | Kottmann | May 8, 1945 |
| 2,696,253 | Hartman | Dec. 7, 1954 |